United States Patent
Serra et al.

(10) Patent No.: US 9,756,694 B2
(45) Date of Patent: Sep. 5, 2017

(54) ANALOG CIRCUIT FOR COLOR CHANGE DIMMING

(71) Applicant: ABL IP Holding LLC, Decatur, GA (US)

(72) Inventors: John G. Serra, Hampshire, IL (US); Michael Gielniewski, Bartlett, IL (US)

(73) Assignee: ABL IP HOLDING LLC, Decatur, GA (US)

( * ) Notice: Subject to any disclaimer, the term of this patent is extended or adjusted under 35 U.S.C. 154(b) by 0 days.

(21) Appl. No.: 14/525,369

(22) Filed: Oct. 28, 2014

(65) Prior Publication Data
US 2015/0115823 A1    Apr. 30, 2015

Related U.S. Application Data

(60) Provisional application No. 61/898,297, filed on Oct. 31, 2013.

(51) Int. Cl.
*H05B 37/00* (2006.01)
*H05B 33/08* (2006.01)

(52) U.S. Cl.
CPC ....... *H05B 33/086* (2013.01); *H05B 33/0827* (2013.01); *H05B 33/0845* (2013.01); *H05B 33/0857* (2013.01); *Y02B 20/348* (2013.01)

(58) Field of Classification Search
CPC .......... H05B 33/0845; H05B 33/0857
See application file for complete search history.

(56) References Cited

U.S. PATENT DOCUMENTS

| | | | | |
|---|---|---|---|---|
| 6,149,283 A * | 11/2000 | Conway | ............ | F21S 10/02 362/236 |
| 7,288,902 B1 | 10/2007 | Melanson | | |
| 2004/0085793 A1* | 5/2004 | Afzal | ............ | G06F 1/263 363/142 |
| 2004/0263094 A1* | 12/2004 | Lister | ............ | H05B 33/0857 315/291 |
| 2007/0052376 A1* | 3/2007 | Lee | ............ | H05B 33/0866 315/312 |

(Continued)

OTHER PUBLICATIONS

Office Action for Mexican Patent Application No. MX/A/2014/013180, mailed Mar. 21, 2016, 4 pages (2 pages for English Translation, 2 pages for MX OA).

*Primary Examiner* — Tung X Le
*Assistant Examiner* — Raymond R Chai
(74) *Attorney, Agent, or Firm* — Kilpatrick Townsend & Stockton, LLP

(57) ABSTRACT

An analog-based dimmable LED lighting system includes a plurality of LED lighting modules, which emit light at different correlated color temperature (CCT) ranges. Each of the LED lighting modules is powered by a common dimming signal in the form of an AC voltage which corresponds to a dimming level in a dimming region. Each of the LED lighting modules includes an LED, an analog rectifier bridge to convert the AC voltage of the common dimming signal to a DC voltage, and an analog current limiter connected between the rectifier and the LED to control current through the LED according to the common dimming signal. The LED(s) in the different lighting modules are controlled, via respective analog current limiter, to produce a resultant light at a selected CCT and light intensity according to the common dimming signal.

18 Claims, 12 Drawing Sheets

(56) References Cited

U.S. PATENT DOCUMENTS

| | | | | |
|---|---|---|---|---|
| 2008/0265801 A1* | 10/2008 | Lee | H05B 33/0803 | 315/297 |
| 2009/0026913 A1* | 1/2009 | Mrakovich | H05B 33/0857 | 313/498 |
| 2009/0278476 A1* | 11/2009 | Wilhelmus | H05B 37/02 | 315/297 |
| 2010/0072903 A1* | 3/2010 | Blaut | H05B 33/0863 | 315/185 R |
| 2010/0207544 A1* | 8/2010 | Man | H05B 33/0857 | 315/294 |
| 2010/0219770 A1* | 9/2010 | Kim | H01L 25/0753 | 315/294 |
| 2010/0225241 A1* | 9/2010 | Maehara | H05B 33/0863 | 315/250 |
| 2010/0295460 A1* | 11/2010 | Lin | H05B 33/0812 | 315/193 |
| 2011/0175510 A1* | 7/2011 | Rains, Jr. | C09K 11/574 | 313/32 |
| 2011/0273107 A1 | 11/2011 | Hsia et al. | | |
| 2013/0002157 A1* | 1/2013 | van De Ven | H05B 33/0824 | 315/192 |
| 2013/0076239 A1* | 3/2013 | Chung | H05B 33/0857 | 315/76 |
| 2013/0147388 A1* | 6/2013 | Frost | H05B 33/0818 | 315/250 |
| 2013/0200807 A1* | 8/2013 | Mohan | H05B 37/02 | 315/151 |
| 2013/0300308 A1* | 11/2013 | Sadwick | H05B 33/089 | 315/224 |
| 2014/0001974 A1* | 1/2014 | Lu | H05B 33/0815 | 315/201 |
| 2014/0049172 A1* | 2/2014 | Bakk | H05B 33/0863 | 315/192 |
| 2014/0062318 A1* | 3/2014 | Tischler | H05B 33/0827 | 315/186 |
| 2014/0085873 A1* | 3/2014 | Willis | F21V 17/101 | 362/145 |
| 2014/0117866 A1* | 5/2014 | Hodrinsky | H05B 33/0809 | 315/201 |
| 2014/0125239 A1* | 5/2014 | Sullivan | H05B 33/0815 | 315/200 R |
| 2014/0225529 A1* | 8/2014 | Beczkowski | H05B 33/0866 | 315/297 |
| 2014/0232288 A1* | 8/2014 | Brandes | H05B 33/0803 | 315/250 |
| 2014/0265888 A1* | 9/2014 | Ekbote | H05B 33/0809 | 315/186 |
| 2014/0285102 A1* | 9/2014 | Jain | H05B 33/0815 | 315/201 |
| 2015/0035443 A1* | 2/2015 | Hill | H05B 33/0857 | 315/192 |
| 2015/0312989 A1* | 10/2015 | Wee | H05B 33/0854 | 315/113 |

\* cited by examiner

ANALOG CIRCUIT FOR COLOR CHANGE DIMMING

RELATED CASES

The present application claims priority under 35 U.S.C. §119(e) based on U.S. Provisional Application Ser. No. 61/898,297 filed on Oct. 31, 2013, which is incorporated by reference herein in its entirety.

FIELD

The present disclosure is related to a dimmable LED lighting system and, more particularly, to an analog-based dimmable LED lighting system with all analog drive components or circuitry.

BACKGROUND

Incandescent light sources have been used for many years in lighting fixtures. An incandescent light source, such as an incandescent light bulb, includes a filament, which when heated emits light. The filament in the incandescent bulb typically emits a light with a color temperature of about 3000 Kelvin (K) at full brightness, which is considered a "white" color. As the incandescent light source is dimmed by decreasing current, the filament emits a light that shifts away from a cooler color temperature, e.g., "white", toward a warmer color temperature, such as yellow, orange, and then red. The color temperature change of an incandescent light bulb generally follows the color change of a cooling black body, i.e., a black body locus.

Light Emitting Diodes (LEDs) have begun to replace traditional incandescent light sources in lighting fixtures. LEDs are efficient and reliable, and are able to emit a bright white light. Blue LEDs with a phosphor coating are typically used to produce white light. However, unlike traditional incandescent bulbs, the color temperature of an LED does not significantly change when the LED is dimmed. For example, when dimmed, the white light from an LED does not appear red but instead becomes even more bluish.

One way to simulate the dimming characteristic of an incandescent lamp with an LED light source is to optically mix white LEDs with amber (e.g., yellow/orange) LEDs, and to control their currents in such a manner that the mixed color light from the LED combination changes from white light to a more amber-yellow-white color with dimming. Traditionally, LED systems performing mixing of colored LEDs use individual drivers to control each colored LED separately, or use a single driver designed to have two or more separate output channels, where each output channel is controlled individually within the driver. An example of such a circuit is described in U.S. Pat. No. 7,288,902 to Melanson. These types of LED lighting systems, however, are complex and may require the use of costly electronic components including digital components.

SUMMARY

An analog-based dimmable LED lighting system includes a plurality of all-analog LED lighting modules that utilize all analog components to control the operation of their respective LED(s). The all-analog LED lighting modules are powered by a common dimming signal that can take the form of an AC or DC voltage, which can be supplied directly or indirectly from a dimmer. The common dimming signal corresponds to a selected dimming level in a dimming region. Each of the LED lighting modules includes one or more LEDs, and analog drive circuitry for the LED(s). The analog drive circuitry includes at least an analog current limiter to control the current through the LED(s) according to the common dimming signal. The analog drive circuitry can also include an analog rectifier bridge if the common dimming signal is an AC voltage. For example, in operation, the analog rectifier bridge converts the AC voltage of the common dimming signal to a DC voltage (e.g., pulsating DC voltage), and the analog current limiter controls current through the LED(s) according to the rectified dimming signal. Each of the all-analog LED lighting modules is configured via their analog drive circuitry to control their respective LED(s) to emit light at a different correlated color temperature (CCT) range and at a variable intensity according to the common dimming signal (e.g., low voltage, mid voltage or high voltage signal). Thus, the all-analog LED lighting modules together can produce a resultant light with an overall CCT and intensity that can vary with the common dimming signal over a dimming region to provide for traditional black body incandescent style dimming.

The dimmable LED lighting system can be designed and manufactured in a relatively cost effective manner, with simple or basic analog circuits that use simple, low cost, reliable analog components such as resistors, diodes, Zener diodes, transistors and integrated current controller (e.g., a current limiting LED driver) or a combination thereof. The all-analog LED lighting modules and their analog components can be configured to provide a wide range of control over the properties of the resultant light over a dimming region. The light properties can include intensity, CCT, high general color rendering index (CRI) (e.g., Ra greater than 80 or 90 depending on the application), enhanced R9 and color shifting.

BRIEF DESCRIPTION OF THE DRAWINGS

The description of the various exemplary embodiments is explained in conjunction with the appended drawings, in which.

DETAILED DESCRIPTION OF THE EXAMPLE EMBODIMENTS

Figure 1A:
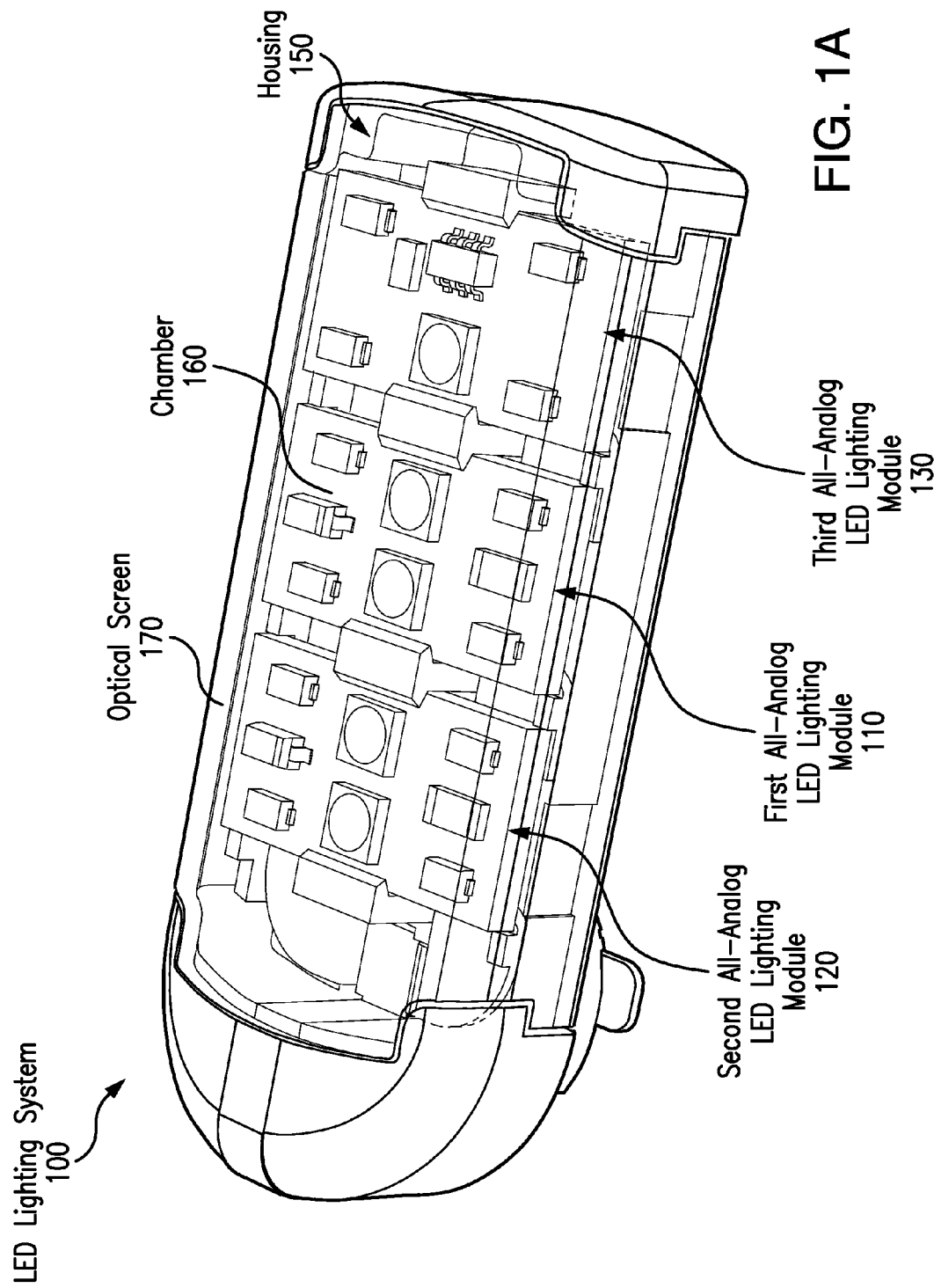
FIGS. 1A and 1B illustrate an example analog-based dimmable LED lighting system in accordance with an embodiment of the present disclosure.

The present disclosure provides an analog-based dimmable LED lighting system with light dimming capabilities similar to that of a traditional black body incandescent style light source. The dimmable LED lighting system includes a plurality of all-analog LED lighting modules, which can utilize all analog components without any digital components, to control the operations of their respective LED(s). The all-analog LED lighting modules are powered by a variable common dimming signal, such as an AC or DC voltage signal from a dimmer which corresponds to a selected dimming level within a dimming region. Each of the all-analog LED lighting modules includes analog drive circuitry for the LEDs. Each LED lighting module can include one or more types of LEDs with the same or different power rating (e.g., same or different current and/or voltage rating) and can emit light at different correlated color temperature (CCT) ranges and at variable intensities. Therefore, the dimmable LED lighting system can be designed and constructed with all-analog LED lighting modules that can emit light at different CCT ranges and at variable intensities, and together produce a resultant light with an overall CCT and intensity according to the common dimming signal over a dimming region. For example, the dimmable LED lighting system can vary the CCT of the resultant light (e.g., warm to cooler or vice-a-versa) and its intensity as the power of the common dimming signal varies, e.g., as the magnitude of the voltage of the dimming signal is reduced or increased.

The all-analog LED lighting modules and their components can be designed with low cost analog components to provide a wide range of control over the properties of the resultant light produced over a dimming region by the dimmable LED lighting system. The light properties can include intensity, CCT, high general color rendering index (CRI) (e.g., Ra greater than 80 or 90 depending on the application), enhanced R9 and color shifting. Thus, the dimmable LED lighting system can be configured with low cost analog components to produce a resultant light having higher color rendering index (CRI) with proper color mixing throughout a dimming region.

Prior to discussing the exemplary embodiments of the dimmable LED lighting system and method of the present disclosure in greater detail with reference to the figures, various terms as used herein are explained below.

Spectral Power Distribution (SPD) describes the power per unit area per unit wavelength of an illumination (radiant existence) or more generally, the per-wavelength contribution to any radiometric quantity.

Correlated Color Temperature (CCT) is a specification of the color appearance of the light emitted by a lamp, relating its color to the color of light from a reference source when heated to a particular temperature, measured in degrees Kelvin (K). The CCT rating for a lamp is a general "warmth" or "coolness" measure of its appearance. However, opposite to the temperature scale, lamps with a CCT rating below 3200 K are usually considered "warm" sources, while those with a CCT above 4000 K are usually considered "cool" in appearance.

Planckian Locus (also referred to as "Black Body Locus") is the path or locus that the color of an incandescent black body would take in a particular chromaticity space as the black body temperature changes.

Color Rendering Index (CRI) is a quantitative measure of the ability of a light source to reproduce the colors of various objects faithfully in comparison with ideal or natural light sources. The CRI system is administered by the International Commission of Illumination (CIE). The CIE selected fifteen test color samples to grade the color properties of a white light source. The first eight samples R1-R8 are relatively low saturated colors and are evenly distributed over the complete range of hues. These eight samples are employed to calculate the general color rendering index Ra. The general color rendering index Ra is simply calculated as the average of the first eight color rendering index values R1 through R8. The sample R9 is a value for a saturated or deep Red.

A dimming region can for example be a range of operational parameter(s) of a lighting system over its output range or curve, e.g., 0%-100% light output. For example, a typical phase cut range of 45° to 145° phase angle or 0 to 10V DC of analog range will result in 0%-100% light output.

Figure 1B:
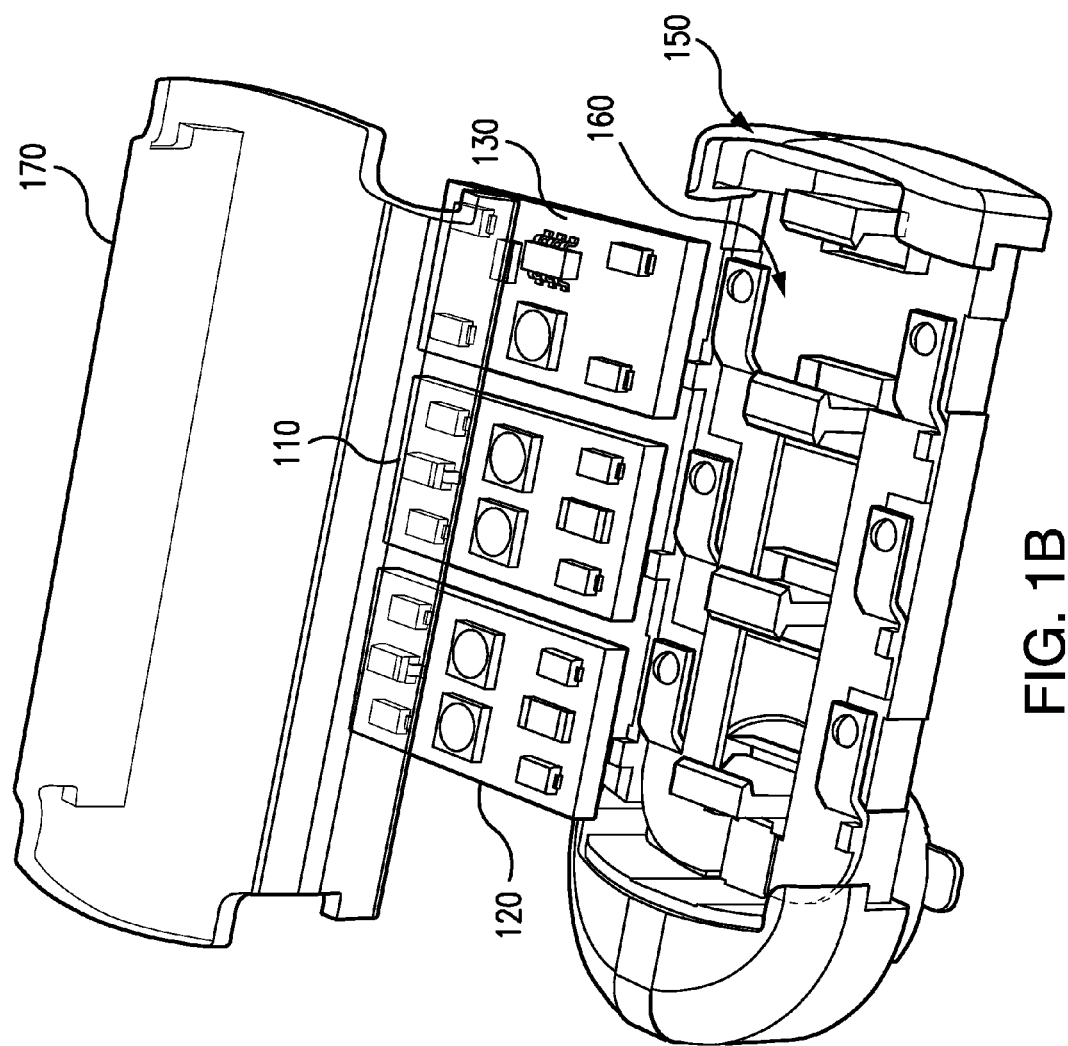

Turning to the figures, an example of an analog-based dimmable LED lighting system 100 is shown in FIGS. 1A and 1B, which provides for incandescent style dimming. The dimmable lighting system 100 includes a plurality of all-analog LED lighting modules, each of which is configured to selectively emit light at a different correlated color temperature (CCT) range according to a dimming signal over a dimming region. In this example, the dimmable lighting system 100 includes three all-analog LED lighting modules, such as a first all-analog LED lighting module 110, second all-analog LED lighting module 120 and third all-analog LED lighting module 130, which are all maintained in a housing 150. The housing includes a chamber 160 (e.g., a mixing chamber) and an optical screen 170 through which light is emitted from the all-analog LED lighting modules 110, 120 and 130. The first all-analog LED lighting module 110 is arranged in the housing 150 between the second all-analog LED lighting module 120 and the third all-analog LED lighting module 130. The housing 150 or components thereof can be made of a formulated plastic to mix the resultant light, thereby producing smooth and artifact free light, generally in the white region between 1,650K and 3,500K.

Figure 2A:
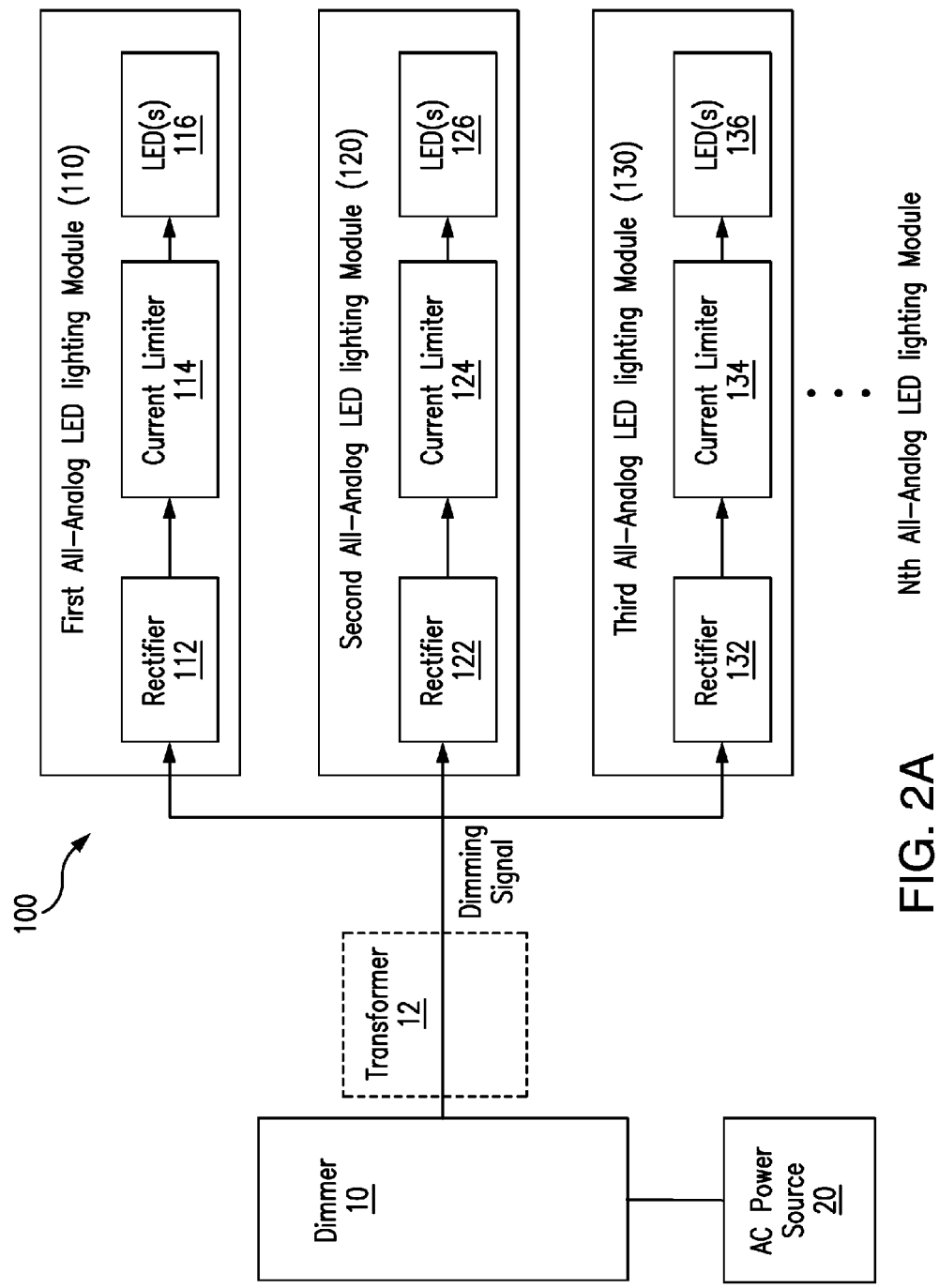
FIG. 2A illustrates a block diagram of one example of exemplary components of the dimmable LED lighting system of FIG. 1.

As shown in FIG. 2A, each of the all-analog LED lighting modules 110, 120 and 130 is powered by a common dimming signal, which can be received directly or indirectly from a dimmer 10 that is coupled to an AC power source 20 (e.g., 120 VAC source). The dimming signal can be one which is commonly in use today, such as with phase cut dimmers or 0-10V dimmers. In this example, the common dimming signal is an AC voltage that corresponds to a dimming level at which to operate the lighting system 100. The dimmer 10 can be part of a transformer-based dimmer system, which may include a transformer 12 such as an electronic or magnetic transformer. The transformer 12 can be a step up/down transformer. For example, it can be a 120 VAC to 12 VAC step down transformer. Each of the all-analog LED lighting modules 110, 120 and 130 are designed to emit light at different CCT ranges. For example, each of the all-analog LED lighting modules 110, 120 and 130 can include one or more different types of LEDs, which emit light at different CCT ranges. The all-analog LED lighting modules 110, 120 and 130 selectively emit light, which is mixed to produce a resultant light with desired overall CCT and intensity according to the selected dimming level as reflected by the common dimming signal.

As further shown in FIG. 2A, the first all-analog LED lighting module 110 includes an analog rectifier 112, an analog current limiter 114 and one or more LEDs 116. The analog rectifier 112 converts the AC voltage of the common dimming signal into a pulsating DC voltage. The analog current limiter 114 receives as input the DC voltage and controls current through the one or more LEDs 116 according to the DC voltage associated with the common dimming signal. Accordingly, the analog current limiter 114 can be configured to vary the current supplied to the LED(s) 116 according to a magnitude of the common dimming signal. As an example, the first all-analog LED lighting module 110 can have one or more LEDs 116 which emit warm white light between 2,650K and 3,550K. For instance, the LED(s) 116 can include two 3,000K warm white LEDs (6V) connected in series with the analog current limiter 114 which can have a 3.3V Zener diode and a current limiting resistor.

The second and third all-analog LED lighting modules 120 and 130 also include an analog rectifier, an analog current limiter and one or more LEDs. For example, the second all-analog LED lighting module 120 includes an analog rectifier 122, an analog current limiter 124 and one or more LEDs 126. The second all-analog LED lighting module 120 can have LED(s) 126 which emit warm white light between 2,150K and 2,650K. For instance, the LED(s) 126 can include two 2,400K warm white LEDs (e.g., one at 3V and one at 6V) connected in series to the current limiter 124 which can include a 1.8V Zener diode and a current limiting resistor.

Figure 2B:
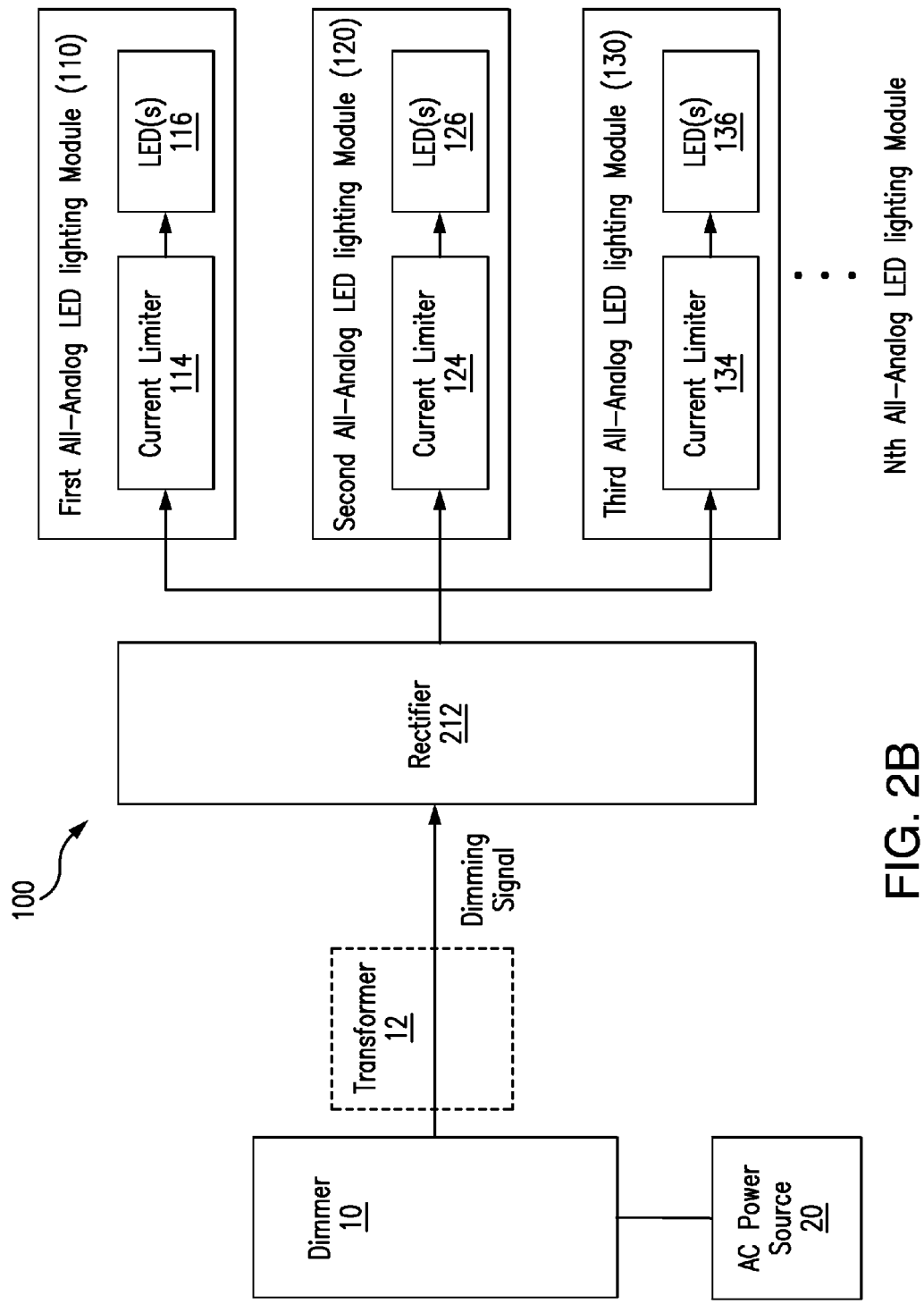
FIG. 2B illustrates a block diagram of another example of exemplary components of the dimmable LED lighting system of FIG. 1 which uses a single rectifier in accordance with a further embodiment of the present disclosure.

The third all-analog LED lighting module 130 also includes an analog rectifier 132, an analog current limiter 134 and one or more LEDs 136. The third all-analog LED lighting module 130 can have one or more LEDs 136 which emit warm white light between 1,650K and 2,200K. For instance, the LED(s) 136 can include one 1,800K warm white LED (3V) connected in series with the current limiter 134 which can include a current limiting LED driver and a current setting resistor. Although each all-analog LED lighting module can include a separate analog rectifier as shown in the example of FIG. 2A, the LED lighting system can be configured instead with a single analog rectifier 212 to supply a rectified dimming signal to each of the modules as shown in the example of FIG. 2B.

The resultant light produced by the dimmable LED lighting system over a dimming region can be customized with desired light properties through the selection of the LED(s) and the design of the analog current limiter in each all-analog LED lighting module. The analog current limiter can be designed in view of the operational characteristics of diodes, such as LEDs. For example, an LED obeys diode law that relates current flow through a diode to the voltage applied to the diode. Sufficient current flow through an LED generates light. The relationship between applied voltage to the diode ($V_d$) and current flow through the diode ($I_d$) can be expressed by the following exemplary equation:

$$I_d = I_s * (e^{Vd/Vt} - 1) I_s * e^{Vd/Vt} - I_s,$$

where
  $I_d$ is the current through a diode such as a light emitting diode (LED),
  $I_s$ is a constant characteristic of the LED,
  $V_d$ is a voltage across the LED, and
  $V_t$ is a threshold voltage characteristic of the LED (where Vt=nVth, in which Vth=Voltage thermal and n=diode quality factor)

Figure 3:
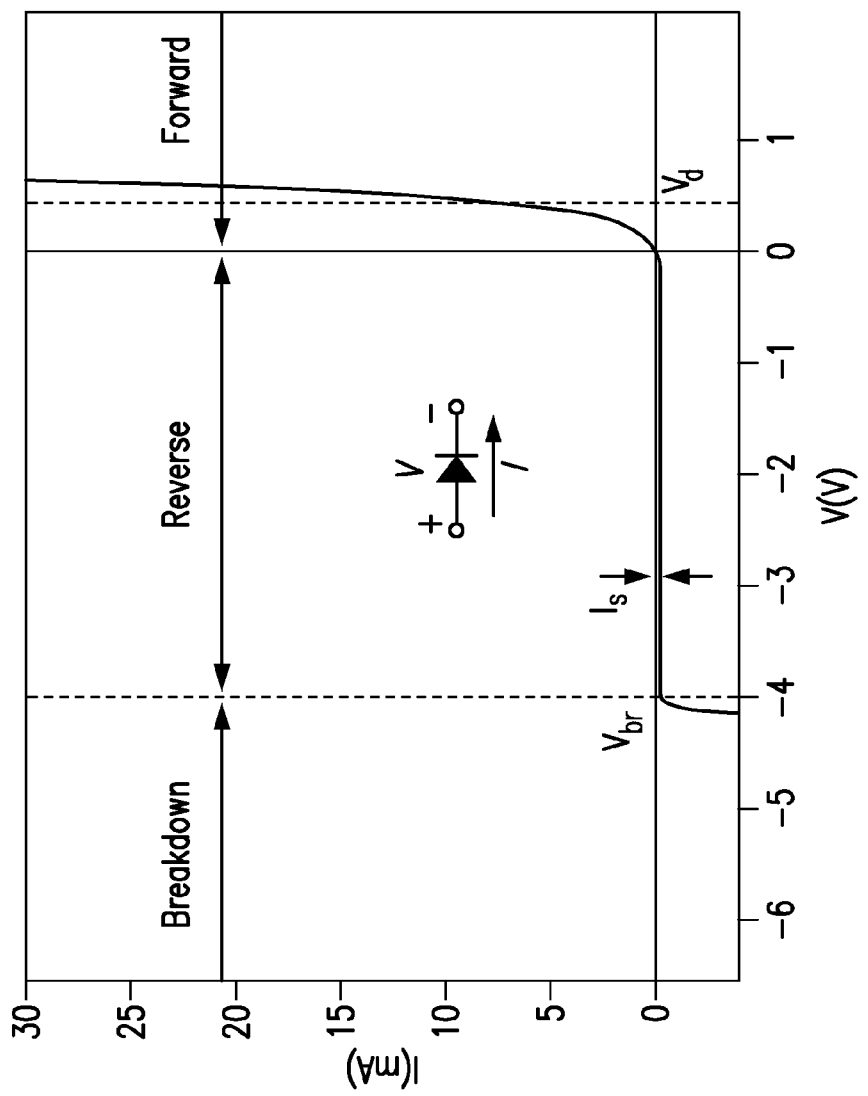
FIG. 3 illustrates an exemplary graph of I (current) versus V (voltage) characteristic of a diode, such as a light emitting diode (LED).

When $V_d$ is greater than $V_t$, the 1st exponential term, $I_s * e^{Vd/Vt}$, predominates and the second term $I_s$ can be neglected. The term e is a known constant at 2.71. The current-to-voltage (I-V) relationship of a diode is shown by the example I-V graph 300 in FIG. 3. The I-V graph 300 shows the basic operational characteristics of a diode, e.g., breakdown, reverse-bias and forward-bias and their associated voltage(s) and current(s), such as the breakdown voltage ($V_{br}$), the saturation current ($I_s$) and the voltage applied across the diode ($V_d$).

Figure 4:
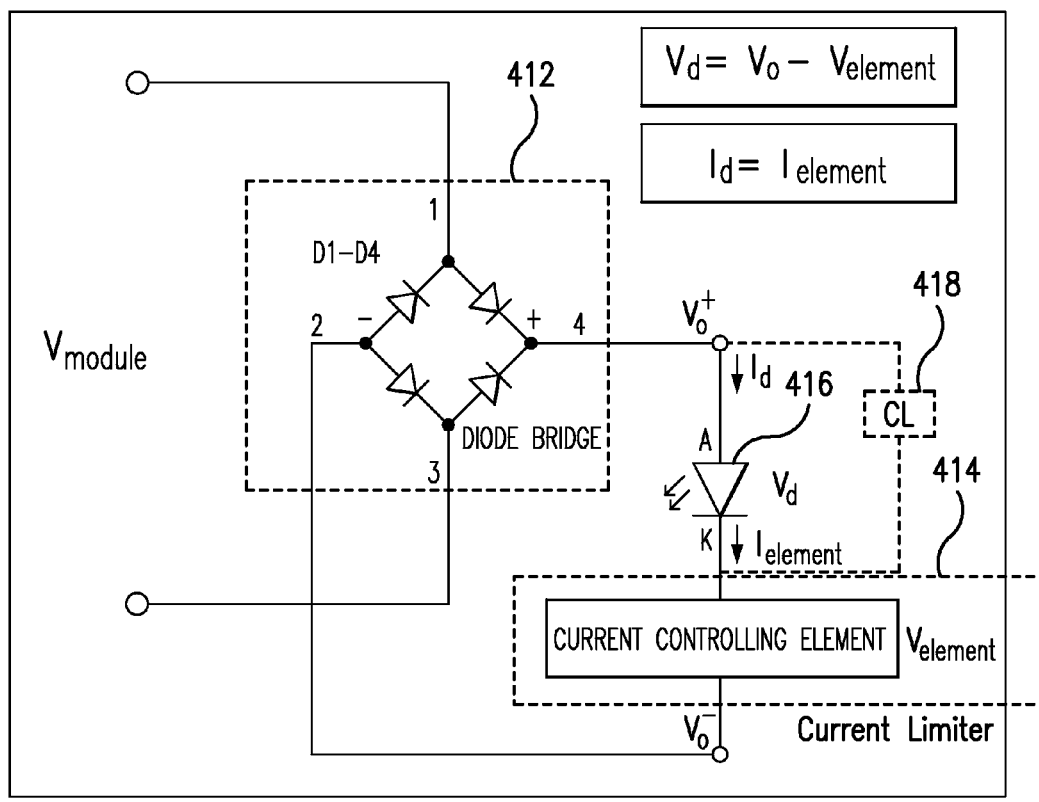
FIG. 4 illustrates an exemplary circuit diagram for an LED lighting module of the dimmable LED lighting system of FIG. 1.

The dimmable LED lighting system 100 can thus utilize basic analog components to control $I_d$ in each of the separate all-analog LED lighting modules (e.g., 110, 120 and 130) and at different rates to develop a resultant light intensity and CCT relative to the common dimming signal, as desired. An exemplary circuit diagram of an all-analog LED lighting module 400 for a dimmable LED lighting system is shown in FIG. 4 for the purposes of explanation. In FIG. 4, the all-analog LED lighting module 400 includes an analog rectifier 412, an analog current limiter 414 and an LED 416. In this example, the analog rectifier 412 is a diode bridge formed of diodes D1 through D4, which can be a Schottky or other rectifier diodes. The analog rectifier 412 receives an input AC voltage $V_{module}$, and outputs a rectified voltage $V_O$ to the analog current limiter 414. The analog current limiter 414 is a current controlling element, which is used to control voltage across and current through the LED 416 according to the rectified voltage $V_O$. In this example, the relationship between the voltage and current of the analog current limiter 414 and the LED 416 can be expressed by the following equations:

$$V_d = V_O - V_{element}, \text{ and}$$

$$I_d = I_{element},$$

where
  $V_{module}$ is the AC voltage supplied to a module,
  $V_O$ is the rectified voltage of $V_{module}$,
  $V_d$ is the voltage across the LED,
  $I_d$ is the current through the LED,
  $V_{element}$ is the voltage across the current controlling element, and
  $I_{element}$ is the current through the current controlling element.

The analog current limiter can be connected in series to the LED 416 as shown by the analog current limiter 414 (e.g., connected to a cathode side (K) of the LED which is opposite an anode side (A)), or can be connected in parallel to the LED 416 as shown by an analog current limiter 418, Accordingly, the analog current limiter for the all-analog LED lighting module can utilize analog components for the current controlling element in order to selectively control the voltage and current and thus the operation for each LED in the LED lighting module according to the common dimming signal. Furthermore, the all-analog LED lighting module can use the analog current limiter to provide for passive control of an operational state of a LED according to the common dimming signal. For example, the analog current limiter can be designed with low cost, analog components, such as resistors, diodes, transistors, capacitors, inductors and LED constant current controllers and so forth.

Figure 5:
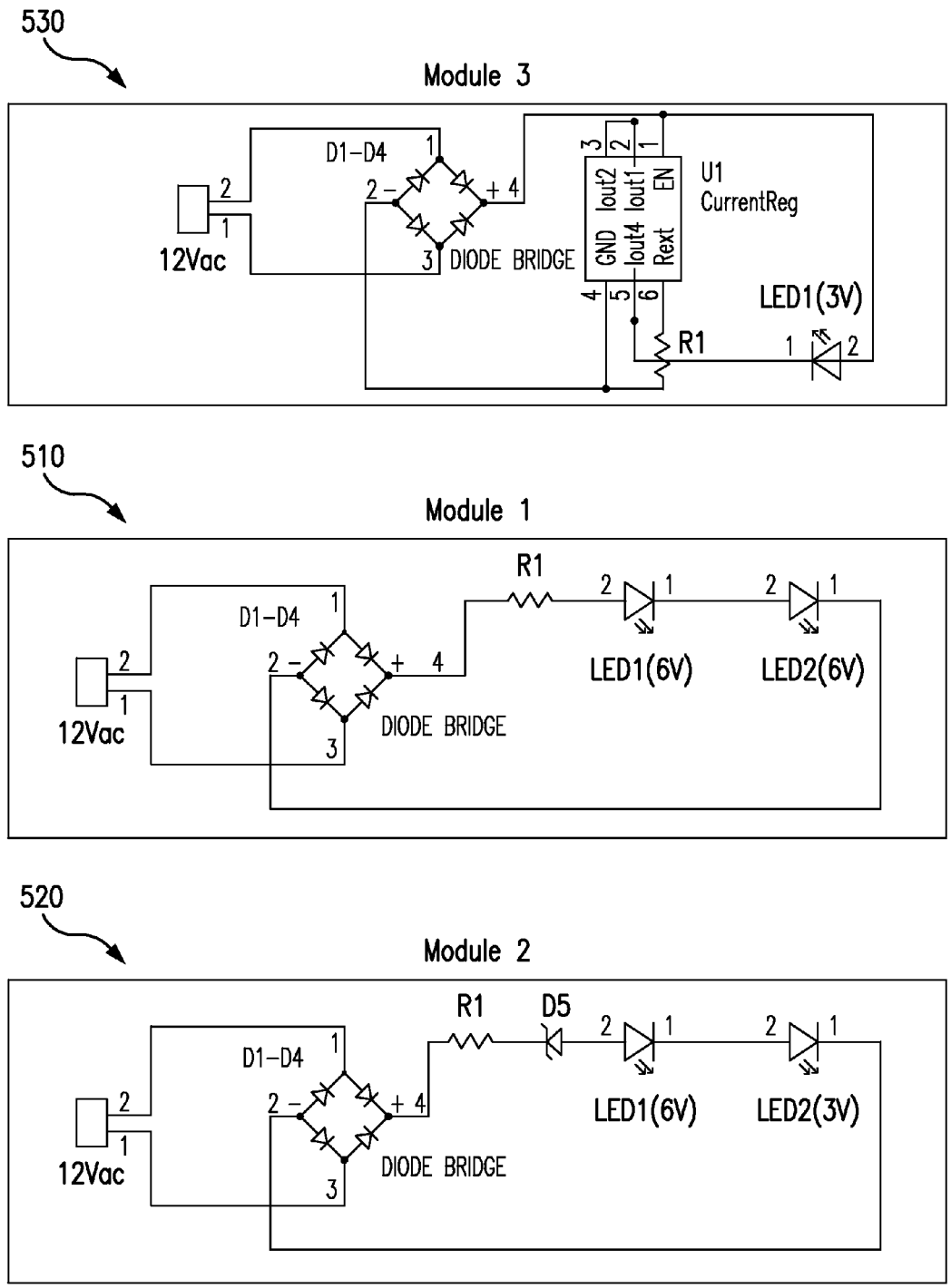
FIG. 5 illustrates exemplary circuit diagram of a dimmable LED lighting system, such as in FIG. 1, which includes three all-analog LED lighting modules, such as first, second and third all-analog LED lighting modules.
Figure 6A:
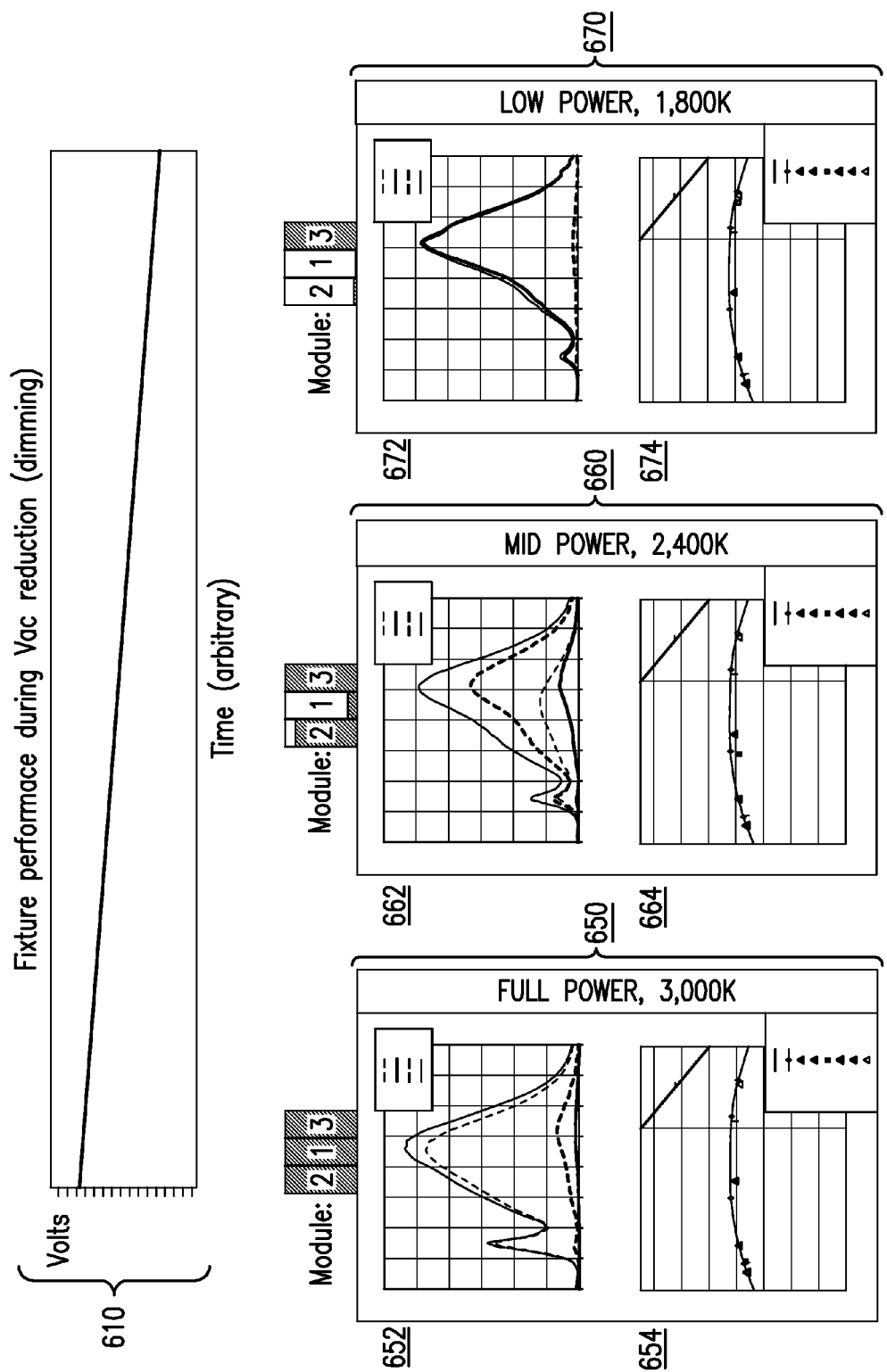
FIGS. 6A-6D illustrate operational performance of the first, second and third all-analog LED lighting modules of FIG. 5 versus in relation to the variable common dimming signal, such as when operating at full power, mid power and low power.
Figure 6B:
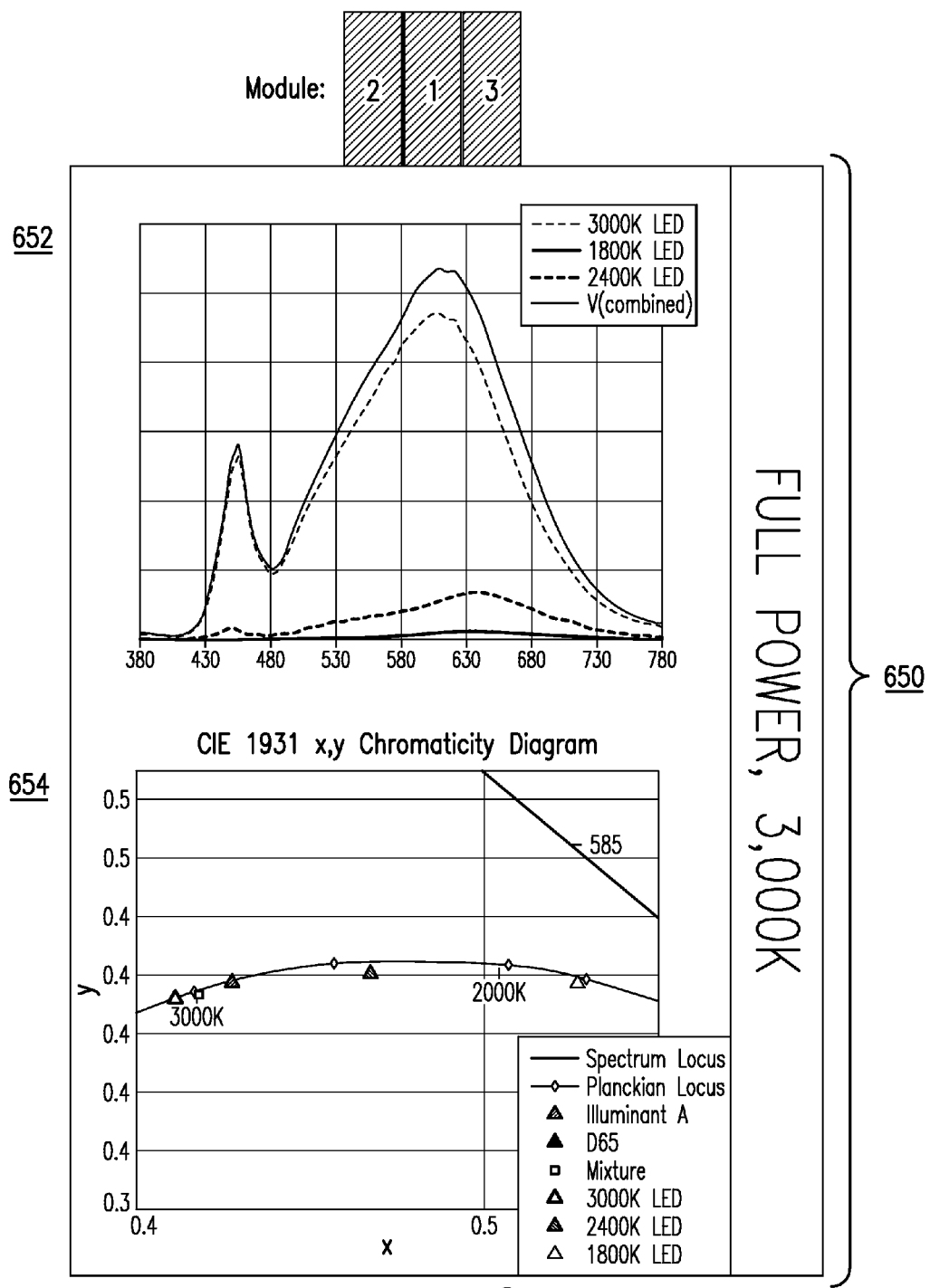
Figure 6C:
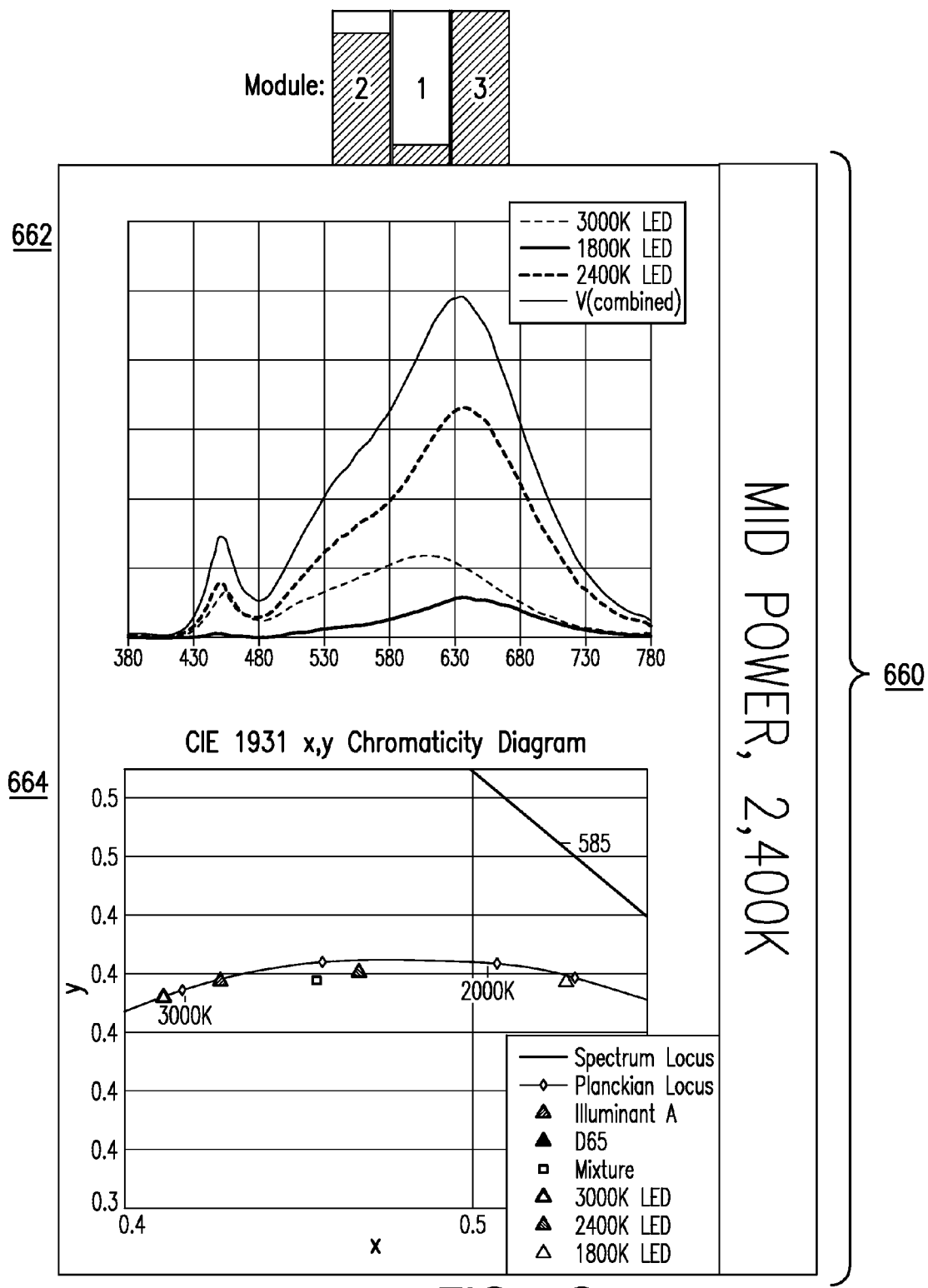
Figure 6D:
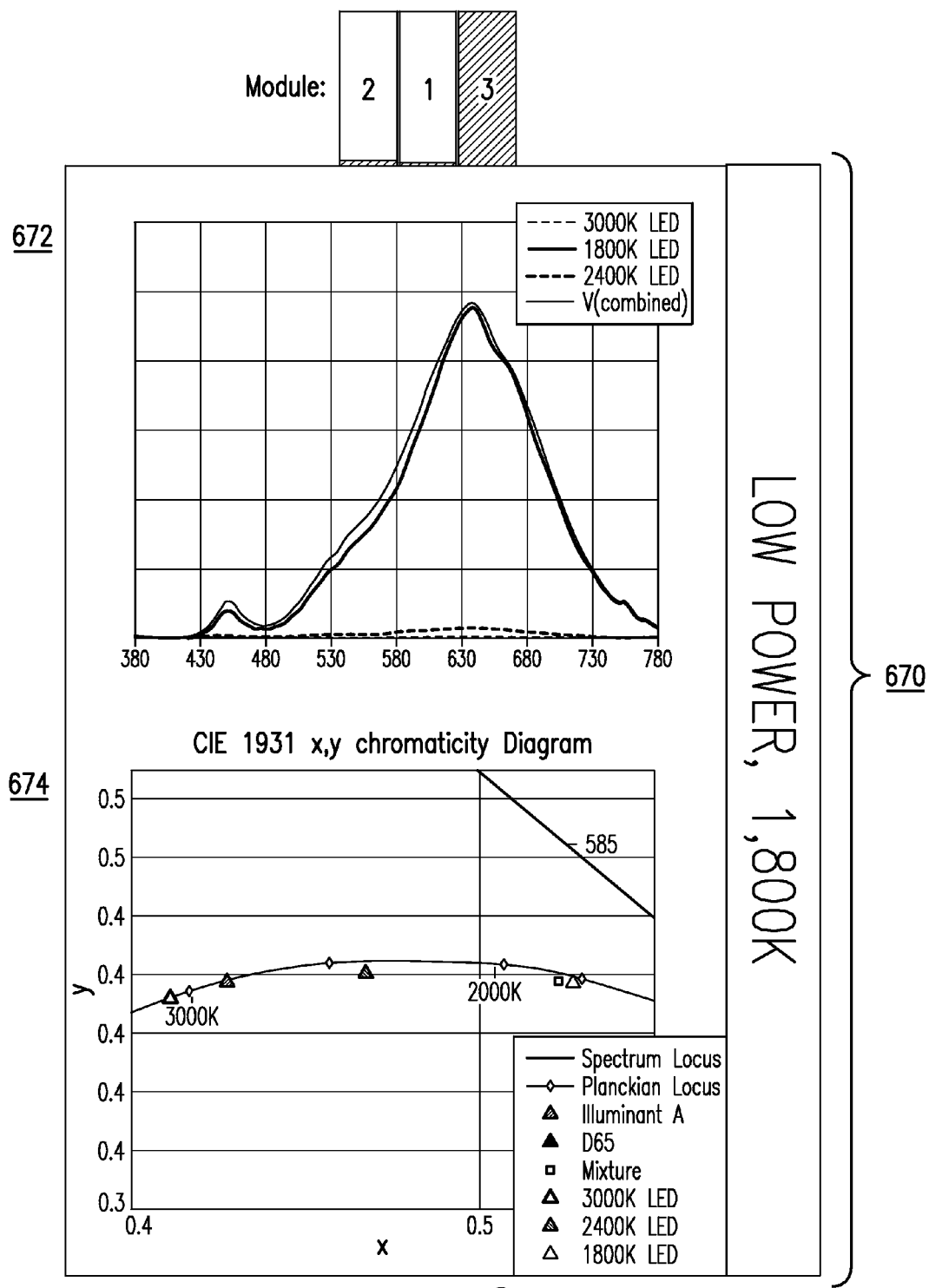

FIG. 5 illustrates example circuit diagrams of first, second and third all-analog LED lighting modules 510, 520 and 530 of a dimmable LED lighting system, such as in FIG. 1. In this example, each of the three all-analog LED lighting modules 510, 520 and 530 are configured to emit light at different CCT ranges and at varying intensities according to the common dimming signal associated with the dimming level. The all-analog LED lighting modules 510, 520 and 530 together can produce a resultant light with an overall CCT, such as warmest light (e.g., about 1800K) at low power, warmer light (e.g., about 2400 K) at mid-power and warm light (e.g., about 3000 K) at full power over a dimming region. The all-analog LED lighting modules 510, 520 and 530 can receive a common dimming signal in the form of an AC voltage input, such as for example a 12 VAC rms from a transformer. The dimmer can control/feed an electronic or magnetic transformer (e.g., with 17V peak).

The first all-analog LED lighting module 510 includes a first analog rectifier bridge, a first analog current limiter and one or more first LEDs. The first analog rectifier bridge includes 4 Schottky diodes or other rectifier diodes. The first analog current limiter includes a resistor (R1), which is used to limit the current that can flow through the series connected first LEDs, e.g., LED1 and LED2. The first analog current limiter can also include a diode 5 (D5). In this example, LED1 is a 6V device, and LED2 is a 6V device. D5 is a 3.3V Zener diode. Since these analog components are connected in series, an instant voltage of at least 15.3V and of proper polarity is needed for significant current to flow through them. When significant current flows through the LEDs, they emit visible light. The amount of emitted light can be set to desired level by adjusting a value of the current limiting resistor R1. For example, the value of the resistor R1 or its resistance can be increased to decrease current ($I_d$) through the LEDs and thus reduce the amount of emitted light, or vice-a-versa. The first LED lighting module 510 emits visible light at CCT of about 3,000K.

Similarly, the second all-analog LED lighting module 520 includes a second analog rectifier bridge, second analog current limiter and one or more second LEDs. The second analog rectifier bridge can also include 4 Schottky diodes. The second analog current limiter can include a resistor (R1) and Diode 5 (D5), which are used to limit the current that can flow through the series connected second LEDs, e.g., LED1 and LED2. In this example, LED1 is a 6V device, and LED2 is a 3V device. D5 is a 1.9V Zener diode. Since these analog components are connected in series, an instant voltage of at least 10.9V and of proper polarity is needed for significant current to flow through them. When significant current flows through the LEDs, they emit visible light. The amount of emitted light can be set to desired level by adjusting value of the current limiting resistor R1. For example, the value of the resistor R1 or its resistance can be increased to decrease current ($I_d$) through the LEDs and thus reduce the amount of emitted light, or vice-a-versa. The second all-analog LED lighting module 520 emits visible light at CCT of about 2,400K.

The third all-analog LED lighting module 530 includes a third analog rectifier bridge, third analog current limiter and one or more third LEDs. The third analog rectifier bridge can also include four (4) Schottky diodes. The third analog current limiter can include a resistor (R1) and current controller IC (U1), which are used to limit the current that can flow through the series connected third LEDs, e.g., LED1. In this example, LED1 is a 3V device. The current controller U1 is a 1.5V device. The resistor R1 is a maximum current setting element. When significant current flows through the LEDs, they emit visible light. The amount of emitted light can be set to a desired level by adjusting a value of the current limiting resistor R1 for the current controller U1. For example, the value of the resistor R1 or its resistance can be increased in order to decrease current through the current controller U1 and thus the current ($I_d$), which in turn reduces the amount of emitted light, or vice-a-versa. The third all-analog LED lighting module 530 emits visible light at a CCT of about 1,800K. Although the third all-analog LED lighting module 530 is described with an analog current controller U1, it can be implemented with the same current limiting function using a combination of a single transistor, two diodes and two resistors.

The circuit configurations for the all-analog LED lighting modules 510, 520 and 530 in FIG. 5 are simply provided as examples, and are interchangeable with each other. As generally discussed above, the electrical characteristics of the analog components of the analog current limiter can be selected (e.g., increase or decrease resistance) or combined to vary the amount or intensity of emitted light from each of the modules according to the common dimming signal and the type of LEDs. Furthermore, the analog current limiters of each of the all-analog LED lighting modules can use passive analog components, e.g., resistors, diodes and LED constant current controller, to passively control the operational state of their respective LED(s).

FIGS. 6A-6D illustrate an example of the operating characteristics of the first, second and third all-analog LED lighting modules 510, 520 and 530, respectively, of the dimmable LED lighting system of FIG. 5 in relation to the power of the common dimming signal. The power of the common dimming signal corresponds to the magnitude of the AC voltage input to the modules as shown in the graph 610 of voltage versus arbitrary time. Moving from a left side toward a right side of the graph 610 over the arbitrary period of time, exemplary operating characteristics of each of the LED lighting modules of the dimmable LED lighting system are shown as the system operates from full power 650 (e.g., at or about 3,000K) to mid power 660 (e.g., at or about 2,400K) to low power 670 (e.g., at or about 1,800K) according to the common dimming signal level, e.g., high voltage to mid-voltage to low voltage signal respectively.

When the common dimming signal corresponds to a high voltage, such as shown on the left side of the graph 610, the dimmable LED lighting system is driven to operate at full power as shown by the reference 650. In the full-power scenario, the first, second and third all-analog LED lighting modules are all turned ON, and operating at full or high intensity (as shown by the shading) to produce an overall CCT of at or about 3,000K and at an overall high intensity. Exemplary Spectral Power Distribution (SPD) curves are shown in the graph 652. There is also shown an exemplary chromaticity graph 654 (e.g., CIE 1931 graph).

When the common dimming signal corresponds to a middle voltage (such as shown around the middle of the graph 610), the dimmable LED lighting system is driven to operate at middle power as shown by the reference 660. In the middle power scenario, the first second and third all-analog LED lighting modules are all turned ON but operating at different intensities to produce an overall CCT of at or about 2,400K and an overall middle intensity. For example, the first LED lighting module is operated at a low intensity, the second LED lighting module is operated at a high intensity and the third LED lighting module is operated at full intensity. Exemplary Spectral Power Distribution (SPD) curves are shown in the graph 662. There is also shown an exemplary chromaticity graph 664 (e.g., CIE 1931 graph).

When the common dimming signal corresponds to a low voltage (such as shown on the right side of the graph 610), the dimmable LED lighting system is driven to operate at low power as shown by the reference 670. In the low power scenario, the first and second all-analog LED lighting modules are OFF, and the third all-analog LED lighting module is turned ON at full or high intensity. The overall CCT of the resulting light produced by the dimmable LED lighting system is at or about 1,800K and at an overall low intensity. Exemplary Spectral Power Distribution (SPD) curves are shown in the graph 672. There is also shown an exemplary chromaticity graph 674 (e.g., CIE 1931 graph).

As reflected in this example, the dimmable LED lighting system is able to selectively extinguish (e.g., turn OFF) the LED lighting modules according to the dimming signal and associated color change (e.g., CCT of the resultant light). For example, the LED lighting modules can use diodes (e.g., series diodes) to selectively control power to their LED(s) based on the dimming signal (e.g., the magnitude of the dimming signal).

Figure 7:
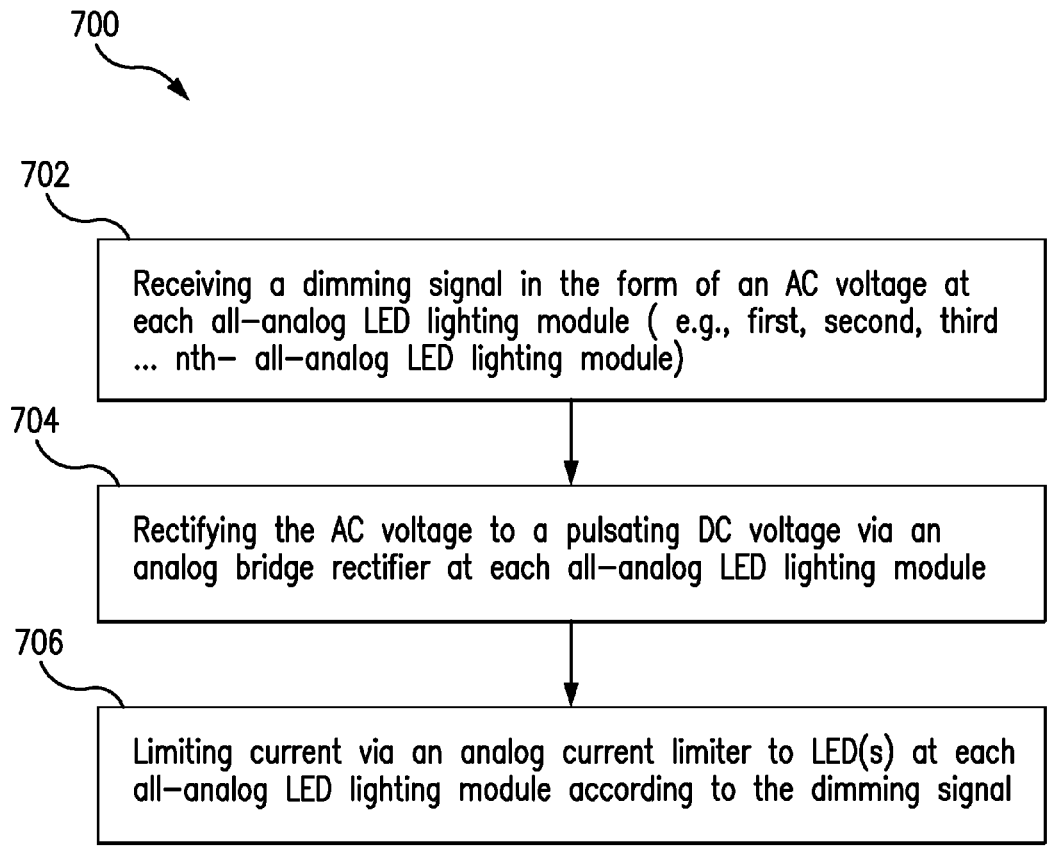
FIG. 7 illustrates an exemplary process implemented by a dimmable LED lighting system, such as in FIGS. 1 and 2, in accordance with an embodiment of the present disclosure.

FIG. 7 illustrates an exemplary process 700 implemented by the dimmable LED lighting system of FIG. 1, in accordance with an embodiment of the present disclosure. At reference 702, a common dimming signal in the form of an AC voltage is received at each all-analog LED lighting module (e.g., first, second, third . . . nth-all-analog LED lighting module). At reference 704, the AC voltage is rectified to a DC voltage via an analog bridge rectifier at each all-analog LED lighting module. At reference 706, current supplied to the LED(s) is limited via an analog current limiter at each LED lighting module according to the common dimming signal. For example, at each all-analog LED lighting module, the analog current limiter controls the current through the respective LED(s) according to the DC voltage outputted from the analog rectifier bridge. Thus, at each all-analog LED lighting module, the current flow to the LED(s) is controlled to vary according to the power of the common dimming signal, as desired, via the analog current limiter, which can be designed with low cost analog components. In this way, each of the all-analog LED lighting modules are controlled to selectively emit light at a particular CCT range and intensity in order to produce an overall mixed resultant light with a desired CCT range and intensity over a dimming region.

Although various examples of the dimmable LED lighting system are described in which the common dimming signal is an AC voltage, the dimmable LED lighting system can be powered and controlled using either an AC voltage or DC voltage (e.g., 0-10V) as the common dimming signal. Furthermore, in each LED lighting module, the analog current limiter can utilize analog circuits or components (e.g., diodes, resistors and/or LED constant current controller) in series, in parallel or a combination thereof to control current through the LED(s). In addition, the various analog components can also be provided on a printed circuit board, such as on one or more FR-4 PCBs. The dimmable LED lighting system can be used in accent, cove, down light, track lighting or other types of luminaires.

Words of degree, such as "about", "substantially", and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the invention.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention.

The invention claimed is:

1. A dimmable LED lighting system comprising:
a plurality of all-analog LED lighting modules each of which emits white light at a different correlated color temperature (CCT) range, each of the all-analog LED lighting modules being powered by a dimming signal that is common to the plurality of all-analog LED lighting modules, wherein the common dimming signal is produced by a dimmer and corresponds to a dimming level in a dimming region, each of the all-analog LED lighting modules including an LED and analog drive circuitry for the LED, the analog drive circuitry including:
an analog current limiter, which is connected to the LED, to control current through the LED according to the common dimming signal,
wherein the all-analog LED lighting modules comprise a first all-analog LED lighting module and a second all-analog LED lighting module, the first all-analog LED lighting module has a first analog current limiter using a first resistor and a diode, the second all-analog LED lighting module has a second analog current limiter using a second resistor and an integrated current controller, wherein the analog drive circuitry of each of the all-analog LED lighting modules is configured differently from one another based on the LED used in a respective all-analog LED lighting module,
wherein, as the dimming level is lowered, the dimmable LED lighting system emits light at an overall lower CCT and at an overall lower intensity.

2. The dimmable LED lighting system of claim 1, wherein the common dimming signal is a DC voltage signal.

3. The dimmable LED lighting system of claim 1, wherein the common dimming signal is an AC voltage signal, the analog drive circuitry of each of the plurality of the all-analog LED lighting modules further including an analog rectifier bridge to convert the AC voltage of the common dimming signal to a pulsating DC voltage which is outputted to a respective analog current limiter.

4. The dimmable LED lighting system of claim 3, wherein the common dimming signal is supplied from the dimmer connected to an AC power source.

5. The dimmable LED lighting system of claim 3, wherein the analog rectifier bridge comprises a plurality of rectifier diodes.

6. The dimmable LED lighting system of claim 1, wherein the analog current limiter comprises a current limiting resistor, transistor, capacitor, inductor or diodes.

7. The dimmable LED lighting system of claim 1, wherein the all-analog LED lighting modules further comprise a third all-analog LED lighting module that has a third analog current limiter using at least a third resistor.

8. The dimmable LED lighting system of claim 1, wherein one of the plurality of the all-analog LED lighting modules includes a plurality of LEDs, each of the plurality of LEDs having a different voltage or current rating.

9. The dimmable LED lighting system of claim 1, wherein the plurality of the all-analog LED lighting modules further comprises a third all-analog LED lighting module, each of the first, second and third all-analog LED lighting modules able to emit light at a different CCT range.

10. The dimmable LED lighting system of claim 9, wherein the LED of one of the first, second and third all-analog LED lighting modules emits a warm light, the LED of a second one of the first, second and third all-analog LED lighting modules emits a warmer light and the LED of a third one of the first, second and third all-analog LED lighting modules emits a warmest light.

11. The dimmable LED lighting system of claim 10, wherein the LED of the first all-analog LED lighting module comprises a substantially 3,000K LED, the LED of the second all-analog LED lighting module comprises a substantially 2,400K LED, and the LED of the third all-analog LED lighting module comprises a substantially 1,800K LED.

12. The dimmable LED lighting system of claim 10, wherein in the first all-analog LED lighting module, the LED includes two substantially 3,000K LEDs;

in the second all analog LED lighting module, the LED includes two substantially 2,400K LEDs; and in the third all-analog LED lighting module, the LED includes one substantially 1,800K LED.

13. The dimmable LED lighting system of claim 1, further comprising a housing to house the plurality of the all-analog LED lighting modules, the housing having an optical screen through which light is emitted from the plurality of the all-analog LED lighting modules.

14. The dimmable LED lighting system of claim 1, wherein the LED and the analog current limiter are connected in series for each of the plurality of the all-analog LED lighting modules.

15. The dimmable LED lighting system of claim 1, wherein the analog current limiter of each of the plurality of the all-analog LED lighting modules includes passive components to passively control an operational state of a respective LED according to the common dimming signal.

16. The dimmable LED lighting system of claim 1, wherein the analog drive circuitry of each of the all-analog LED lighting modules operates independently from one another based on the common dimming signal separately received at each of the all-analog LED lighting modules.

17. The dimmable LED lighting system of claim 1, wherein each of the all-analog LED lighting modules separately receives the common dimming signal and operates independently from one another based on the common dimming signal.

18. The dimmable LED lighting system of claim 1, wherein the analog drive circuitry of each of the all-analog LED lighting modules passively controls an operational state of a respective LED according to the common dimming signal.

* * * * *